(12) United States Patent
Taddiken et al.

(10) Patent No.: US 6,192,387 B1
(45) Date of Patent: Feb. 20, 2001

(54) MULTIPLE RESONANT TUNNELING CIRCUITS FOR SIGNED DIGIT MULTIVALUED LOGIC OPERATIONS

(75) Inventors: Albert H. Taddiken, McKinney, TX (US); Lutz J. Micheel, Dayton, OH (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/066,362

(22) Filed: May 24, 1993

(51) Int. Cl.[7] .................................. G06F 7/00; G06F 7/50
(52) U.S. Cl. ............................................. 708/493; 708/670
(58) Field of Search ............................ 364/746.2, 750.5, 364/784; 708/493, 700, 670

(56) References Cited

U.S. PATENT DOCUMENTS 5,265,044 * 11/1993 Singh .................................... 364/784

OTHER PUBLICATIONS

Kawahito et al, "Multiple–Value Current–Mode Arithmetic Circuits Based on Redundant Positive–Digit No. Representations", IEEE 1991, pp. 330–339.*
Richard Higgins, "Electronics with digital and analog integrated circuits", pp. 288–289, 1983 Prentice–Hall, Inc.*
F. Capasso et al.: "Quantum–Effect Devices, in High–Speed Semiconductor Devices", 1990, edited by S.M. Sze, Wiley–Interscience Publication, John Wiley & Sons Inc., New York, USA, pp. 465–520 (p. 497, paragraph 3–p. 499, paragrah 1).
Hanyu, et al., "Multiple–Valued Programmable Logic Array Based on a Resonant–Tunneling Diode Model", IEICE Trans. Electron., vol. E76–C, No. 7, Jul. 1993, pp. 1126–1132.
Kameyama, et al., "Modular Design of Multiple–Valued Arithmetic VLSI System Using Signed–Digit No. System", IEEE, 1990, pp. 355–362.
Seabaugh, et al., "Quantum Functional Devices: Present Status and Future Prospects", Reprinted from FED Journal, vol. 3, suppl. 1, 1993, pp. 9–20.

(List continued on next page.)

Primary Examiner—Tan V. Mai
(74) Attorney, Agent, or Firm—W. Daniel Swayze, Jr.; Wade James Brady, III; Frederick J. Telecky, Jr.

(57) ABSTRACT

Circuits containing resonant tunneling devices are disclosed which offer significant advantages for realizing ultra-dense, ultra-high performance multivalued logic arithmetic integrated circuits. Multivalued logic circuits implemented with resonant tunneling devices can achieve increased speed and density over binary circuits and multiple-valued circuits implemented in conventional IC technologies since multiple binary bits are very efficiently processed by architectures which make use of devices with multiple negative transconductance regions. In one form of the invention, an adder for calculating the sum of two numbers represented by signed digit range-3 base-4 words is constructed from summation circuits 40 which add corresponding digits of input words X and Y to form digit sums $S_i$, signed range-5 to signed range-3 converter circuits 42 which use multi-level folding circuits 64 connected by voltage dividers to decompose the digit sums into an interim sum and carry digit, and a second set of summation circuits 40 which add interim sum and carry digits to produce the digits of the result. Preferably, the sum is likewise represented by a signed digit range-3 base-4 word. Preferably, the multi-level folding circuits contain resonant tunneling transistors (e.g. bipolar transistors with multiple-peak resonant tunneling diodes 52 integrated into the emitter).

3 Claims, 6 Drawing Sheets

OTHER PUBLICATIONS

Micheel, "Heterojunction Bipolar Technology for Emmitter–Coupled Multiple–Valued Logic in Gigahertz Adders and Multipliers", Proceedings from IEEE Computer Society Technical Committee, May 27–29, 1992, Sendai, Japan, pp. 18–26.

Micheel, et al., "Multiple–Valued Logic Computation Circuits Using Micro—and Nanoelectronic Devices", *IEEE Computer Society Press Reprint*, May 24–27, 1993, Sacramento, California, pp. 164–169.

Bate, "Nanoelectronics", *Nanotechnology 1*, vol. 1, No. 1, Jul. 1990, pp. 1–7–447.

Goto, et al., "A 250MHz 16b 1–Million Transistor BiCMOS Super–High–Speed Video Signal Processor", IEEE International Solid–State Circuits Conference, 1991, pp. 254–255 and 325.

Micheel, et al., "Differential Multiple–Valued Logic Using Resonant Tunneling Diodes", *Electronic Technology Laboratory*, *Wright–Patterson AFB, OH*, pp. 1–7.

Taddiken, et al., "Application of Resonant Tunneling Devices in Future Electronic Circuits", Government Microcircuit Applications Conference—Digest of Papers, 1992, pp. 13–16.

Frazier, et al., "TP 11.4: Nanoelectronic Circuits Using Resonant Tunneling Transistors and Diodes", IEEE International Solid–State Circuits Conference, 1993, pp. 174–175 and 138–139.

Yokoyama, et al., "Resonant–Tunneling Hot Electron Transistor (RHET)", *Solid–State Electronics*, vol. 31, No. 3/4, 1988, pp. 577–582.

Capasso, et al., "Negative Transconudctance Resonant Tunneling Field–Effect Transistor", *Appl. Phys. Lett.*, 51(7), Aug. 17, 1987, pp. 526–528.

Sollner, et al., "Resonant Tunneling Through Quantum Wells at Frequencies up to 2.5 THz", *Appl. Phys. Lett.*, 43(6), Sep. 15, 1983, pp. 588–595.

Capasso, et al., "8 Quantum–Effect Devices", *High–Speed Semiconductor Devices*, pp. 465–521, 1990.

Chang, et al., "Resonant Tunneling in Semiconductor Double Barriers*", *Appl. Phys. Lett.*, vol. 24, No. 12, Jun. 15, 1974, pp. 593–595.

* cited by examiner

MULTIPLE RESONANT TUNNELING CIRCUITS FOR SIGNED DIGIT MULTIVALUED LOGIC OPERATIONS

CROSS-REFERENCE TO RELATED APPLICATIONS

| Title | Serial No. | Inventor | Docket # |
|---|---|---|---|
| High Frequency High Resolution Quantizer | 07/952,394 | Taddiken | 17052 |
| Multi-Resonant Tunneling Load for High Output Range Multi-valued Logic Circuits | | Taddiken | 17810 |
| Multiple Resonant Tunneling Circuits for Positive Digit Multi-valued Logic Operations | | Taddiken | 17811 |
| Multiple Resonant Tunneling Circuits for Positive Digit Range-4 Base-2 to Binary Conversion | | Taddiken | 17812 |

FIELD OF THE INVENTION

This invention generally relates to integrated circuit devices and more particularly to multivalued logic circuits comprising resonant tunneling devices.

BACKGROUND OF THE INVENTION

Without limiting the scope of the invention, its background is described in connection with resonant tunneling devices and methods for implementing multivalued logic operations.

Resonant Tunneling Devices

Within the last decade, heteroepitaxial technology has allowed researchers to explore the electrical properties of a variety of superlattice, quantum well, and resonant tunneling structures. The first proposals and investigations of the resonant tunneling diode were reported by Chang, Esaki, and Tsu (*Applied Physics Letters*, 24, p. 592) and subsequently given impetus by Sollner et al. (*Applied Physics Letters*, 43, p.588) who observed large negative differential resistance (hereinafter referred to as NDR) in these structures. Because only discrete energy states are available for charge transport through quantum wells, the current-voltage relationship of a resonant tunneling diode may exhibit a peak, i.e., for applied voltages increasing from zero, the diode current increases, then decreases for a range of larger applied voltages. Multiple peak resonant tunneling devices (hereinafter referred to as M-RTD) consisting of series combinations of RTDs in epitaxial stacks have also been demonstrated. Fifteen resonant peaks were achieved in a single heterostructure at room temperature recently fabricated at Texas Instruments.

Since the initial investigations of the RTD, many three-terminal resonant tunneling devices have been proposed and demonstrated (see, for example, F. Capasso, S. Sen and F. Beltram, *High Speed Semiconductor Devices* (S. M. Sze, ed.), p. 465, John Wiley & Sons, New York). Integration of RTDs into one or another of the terminals of conventional transistors has led to a large family of resonant tunneling transistors. Among the most promising of these transistors are: the resonant tunneling bipolar transistor (RTBT) (see, for example, F. Capasso, S. Sen, and A. Y. Cho, *Applied Physics Letters*, 51, p. 526); the resonant tunneling hot electron transistor (RHET) (see, for example, N. Yokoyama et al., *Solid State Electronics*, 31, p. 577); and the resonant tunneling field effect transistor (RTFET). These devices are fabricated by placing RTDs in the emitter terminals of heterojunction bipolar transistors, hot electron transistors or field effect transistors, respectively.

Nanoelectronic devices, such as resonant tunneling diodes and transistors, are under investigation in many laboratories for their potential to operate at dimensions much smaller than conventional transistors can function. The goal of these device designs is to harness the quantum effects themselves to allow scaling to dimensions on a nanometer scale. Examples of such nanoelectronic devices are described, for example, in:

U.S. Pat. No. 4,581,621, "Quantum Device Output Switch", issued Apr. 8, 1986, to Reed;

U.S. Pat. No. 4,704,622, "Negative Transconductance Device", issued Nov. 3, 1987, to Capasso et al.;

U.S. Pat. No. 4,721,983, "Three Terminal Tunneling Device", issued Jan. 26, 1988, to Frazier;

U.S. Pat. No. 4,849,799, "Resonant Tunneling Transistor", issued Jul. 18, 1989, to Capasso et al.;

U.S. Pat. No. 4,851,886, "Binary Superlattice Tunneling Device and Method", issued Jul. 25, 1989, to Lee et al.;

U.S. Pat. No. 4,853,753, "Resonant-Tunneling Device, and Mode of Device Operation", issued Aug. 1, 1989, to Capasso et al.;

U.S. Pat. No. 4,912,531, "Three-Terminal Quantum Device", issued Mar. 27, 1990, to Reed et al.;

U.S. Pat. No. 4,959,696, "Three Terminal Tunneling Device and Method", issued Sep. 25, 1990, to Frensley et al.; and U.S. Pat. No. 4,999,697, "Sequential-Quenching Resonant-Tunneling Transistor", issued Mar. 12, 1991, to Capasso et al.

Multivalued Logic

Binary arithmetic integrated circuits (ICs) have enabled a revolution in the performance of embedded coprocessors and high-performance computers, but scaling limits will ultimately prevent further increases in the speed and density of conventional ICs. Soon after the year 2000, quantum mechanical effects will set fundamental limits on the scalability of conventional transistors (see, for example, R. T. Bate, *Nanotechnology*, 1, p. 1, 1990). Feature sizes less than approximately 0.1 $\mu$m will cause leakage in conventional devices that will prevent scaling from increasing IC performance.

In the future, ultra-high performance digital systems will require clock rates in excess of 10 GHz with minimum data latency. Current systems, using binary computation based on silicon VLSI technology, can achieve reasonably good performance by using complex carry-ripple reduction schemes; however, data latency and ultra-fast computing requirements will make this approach unsuitable for certain classes of systems.

Multivalued Logic (hereinafter referred to as MVL) circuits have the potential for increased speed and density (for the same minimum feature geometry) since multiple binary bits may be simultaneously processed in a single MVL circuit. For examples of multivalued logic adders and multipliers which offer ripple-carry free operation through the use of redundant number systems, see, for example: L. J. Micheel, *Proceedings of the International Symposium on MVL*, 1992; J. Goto et al., *International Solid State Circuits Conference*, 1991; and M. Kameyama, M. Nomura and T. Higuchi, *Proceedings of the International Symposium on MVL*, 1990. To date, implementation of these approaches has been proposed based on conventional integrated circuit families (e.g. CMOS and heterojunction ECL).

SUMMARY OF THE INVENTION

It has been discovered that multiple resonant tunneling devices offer significant advantages for realizing ultra-dense, ultra-high performance multivalued logic arithmetic integrated circuits. Conventional technologies (e.g. CMOS and heterojunction ECL) seem an unnatural choice for MVL ICs due to the complex circuits and high component counts required. Resonant tunneling devices have novel characteristics that will enable ultra-high speed and ultra-high density circuits even before the quantum scaling limits are reached. Multivalued logic circuits implemented with resonant tunneling devices will achieve increased speed and density over binary circuits and multiple-valued circuits implemented in conventional IC technologies since multiple binary bits are very efficiently processed by architectures which make use of devices with multiple negative transconductance regions.

Generally, and in one form of the invention, an adder for calculating the sum of two numbers represented by signed digit range-3 base-4 words is constructed from summation circuits which add corresponding digits of each input word to form digit sums, converter circuits which use multi-level folding circuits connected by voltage dividers to decompose the digit sums into an interim sum and a carry digit, and a second set of summation circuits which add interim sums and carry digits to produce the digits of the result. Preferably, the sum is likewise represented by a signed digit range-3 base-4 word. Preferably, the multi-level folding circuits contain resonant tunneling transistors constructed from bipolar transistors and multiple-peak resonant tunneling diodes.

The adder of the present invention provides several technical advantages over prior art adders. For example, the novel adders described herein are faster and denser than conventional adders. Ripple carries are eliminated by the preferred embodiments described herein. The speed of the circuit is independent of input word width. Other technical advantages will be readily apparent to one skilled in the art from the following descriptions, figures and claims.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings.

In the drawings.

DETAILED DESCRIPTION OF THE PREFERRED EMBODIMENTS

The advantages of multivalued logic arithmetic are illustrated in the following example. In most conventional digital processors, number are represented in a base-2 range-2 numeration system. That is, the unit value of each digit increases in base-2 progression (1, 2, 4, 8, etc.), and each digit may take on one of only two values (0 or 1). Conventional digital processor architectures can add pairs of N-bit numbers in a single processor cycle. However, time delays occur during binary addition because carry bits must propagate through the adder circuitry. Carry propagation delays set an upper limit on processor performance. For example, adding the following numbers in base-2 range-2 representation using simple binary arithmetic requires the long-distance propagation of a carry bit across the entire addition chain:

$$\begin{aligned}
01111 &= 15(\text{base }10) \\
+\ 00001 &= 1(\text{base }10) \\
\hline
10000 &= 1*(16)+0*(8)+0*(4)+0*(2)+0*(1) = 16(\text{base }10)
\end{aligned}$$

← carry

The carry propagation problem can be eliminated if data operands are encoded and processed using a multivalued representation. This approach uses a higher range to represent information so that ripple carries are never produced, and carry propagation delays are eliminated. The numbers from the previous example can be added without the need for carry generation when represented in base-2 range-3, where each column of bits is separately added using numerical rather than binary addition. The range-3 representation of the result makes carry ripple unnecessary:

$$\begin{aligned}
01111 &= 15(\text{base }10) \\
+\ 00001 &= 1(\text{base }10) \\
\hline
01112 &= 0*(16)+1*(8)+1*(4)+1*(2)+2*(1) = 16(\text{base }10)
\end{aligned}$$

It is important to note that, even though the range of the result is higher, the base of the number system used to represent the result has not changed. That is, the unit value of each digit position still increases in the base-2 progression of 1, 2, 4, 8, and so on. The use of range-N numeration to encode information in base-M progression is called redundant digit M,N coding. If the digits may take on only positive values, then the numeration system is referred to as redundant positive digit M,N coding. The numeration system of the example above is therefore redundant positive digit 2,3 coding. A numeration system which allows positive and negative digit values is referred to as redundant signed digit M,N coding.

It has been discovered that the scaling and speed advantages of the redundant digit arithmetic concept described above can be realized very efficiently by circuits which make use of multiple resonant tunneling devices.

Figure 1:
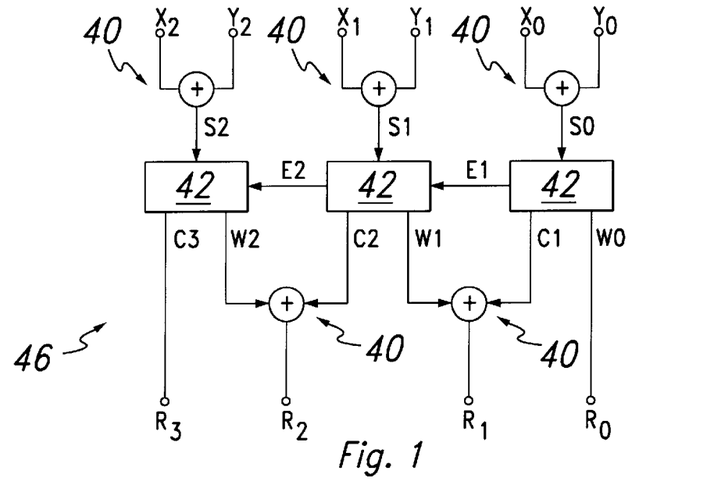
FIG. 1 is the block diagram of the preferred embodiment of a redundant signed digit range-3 base-4 adder.

The block diagram of the preferred embodiment of an adder of numbers represented by redundant signed digit 4,3 coding is shown in FIG. 1. Digits may take on the values −2, −1, 0, 1 and 2 (i.e. signed range-3 numeration). The progression of the numeration system is base-4. The block diagram of FIG. 1 is for input words of up to three digits in word width, although the technique may obviously be extended to arbitrary word widths.

Signed redundant digit 4,3 coding is used to represent base-4 information in a redundantly encoded (signed range-3) representation so that ripple carries are never produced. This means that any output digit, e.g. $R_2$, is completely determined by the first four input digits of equal or lower significance, e.g. $X_2$, $Y_2$, $X_1$ and $Y_1$. Addition is performed in three steps:

Step 1: $S_i = X_i + Y_i$
Step 2: $4C_{i+1} + W_i = S_i$
Step 3: $R_i = W_i + C_i$ where the base-10 value of the result is given by $$\sum_{i=0}^{n-1} 4^i R_i$$

where n is the number of digits in the output word.

With reference to FIG. 1, Pairs of input digits ($X_i$, $Y_i$) are first summed using summation circuits 40 to produce outputs digit sums $S_i = X_i + Y_i$ (Step 1, above). $S_i$ may take on states −4, −3, −2, −1, 0, 1, 2, 3 and 4 and is therefore signed range-5. Each digit sum is then converted into a carry digit $C_{i+1}$, an interim-sum $W_i$, and a control signal $E_{i+1}$ by a signed range-5 to signed range-3 converter (hereinafter referred to as a SR5-SR3 converter) 42. The SR5-SR3 converter performs the decomposition function of Step 2, above. Finally, outputs from the adjoining SR5-SR3 converters are shared and summed by additional summation circuits 40 to produce a signed range-3 output result (Step 3, above). The control signal $E_{i+1}$ is used by the next more significant converter and insures that the resulting digits are signed range-3. The adder shown can be extended to compute the sum of two numbers of arbitrary word width. The speed of the circuit is independent of the number of input digits because only local intermediate results are shared within the circuit.

In the following discussion of the operation of the preferred circuit embodiments, the inputs and outputs will be referred to as states rather than voltages. The voltage corresponding to each state is a design choice and the correspondence between voltage and state will be obvious to one of ordinary skill in the art. In a particular circuit design, for example, each state might differ from the next state by 0.3 volts. In the preferred embodiment of the adder, circuit voltages are generally proportional to the states they represent. It is contemplated that in some alternate embodiments the relationship between voltage and state need not be strictly linear nor strictly proportional.

The function of the summation circuit 40 may be accomplished by any circuit which produces an output signal which is proportional to the sum of its inputs. Such circuits are well known in the art.

Figure 2:
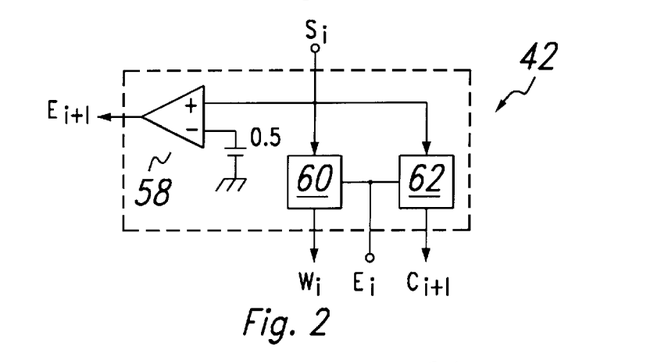
FIG. 2 is a block diagram of the preferred embodiment of a signed range-5 to signed range-3 converter.

The block diagram of the preferred embodiment of the SR5-SR3 converter is shown in FIG. 2. The comparator 58 generates the control signal $E_{i+1}$, which is an input to the next more-significant converter, by comparing the digit sum $S_i$ with 0.5. If $S_i$ is greater than 0.5, $E_{i+1}=1$, otherwise $E_{i+1}=0$.

Figure 3A:
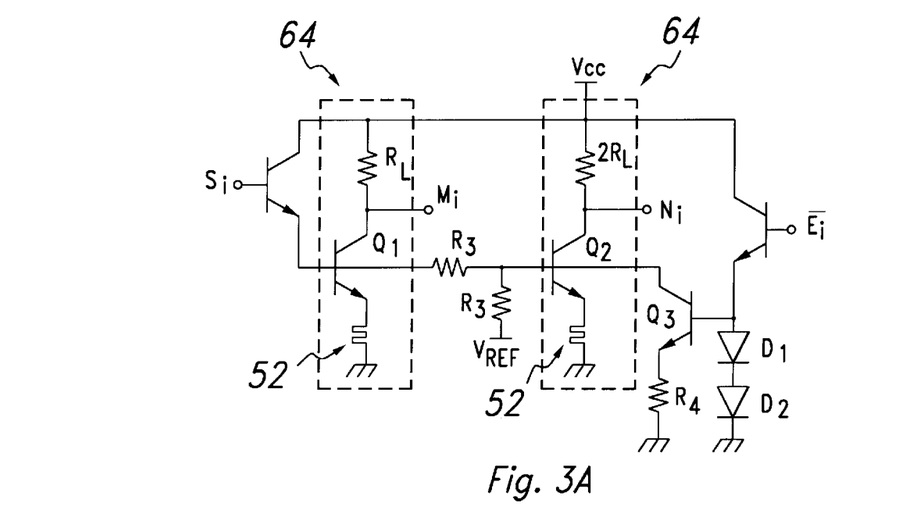
FIGS. 3A and 3B are schematics of the preferred embodiment of the interim sum subcircuit.
Figure 3B:
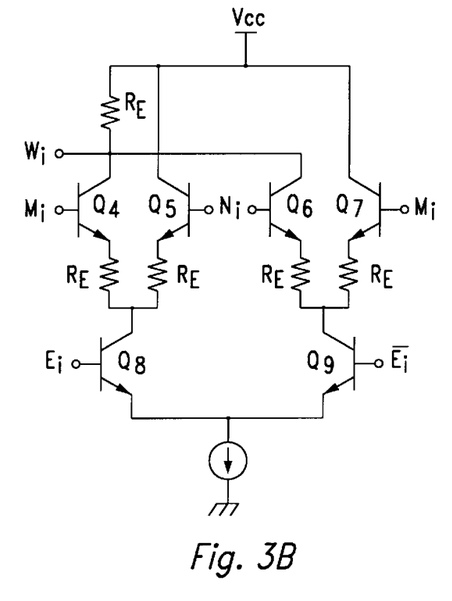
Figure 4:
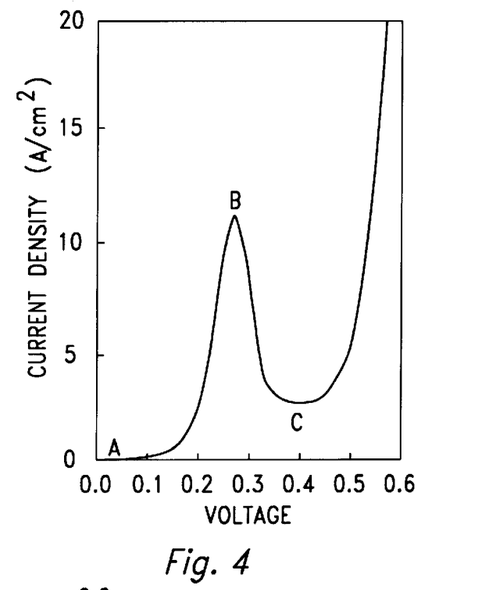
FIG. 4 is a graph of the current-voltage characteristic of a typical resonant tunneling diode.

The interim sum subcircuit 60 has two inputs, $S_i$ and $E_i$, the control signal from the next less-significant converter. The interim sum subcircuit produces the output $W_i$. FIGS. 3A and 3B are schematics of the preferred embodiment of the interim sum subcircuit 60. The circuit of FIG. 3A produces intermediate signals $M_i$ and $N_i$, which depend on inputs $S_i$ and $E_i$. The circuit of FIG. 3B then produces $W_i = N_i - M_i$ for $E_i$ high, or, when $E_i$ is low, $W_i = M_i - N_i$. The operation of these circuits is explained and discussed hereinbelow.

Figure 5A:
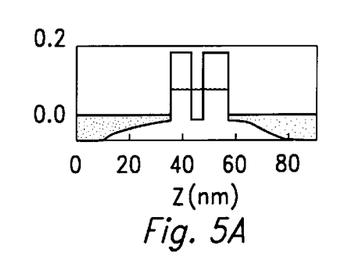
FIGS. 5A–5C are conduction band energy diagrams of a typical resonant tunneling diode with increasing applied voltages.
Figure 5B:
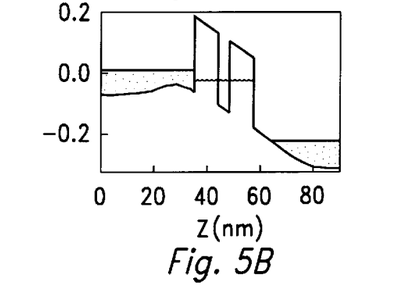
Figure 5C:
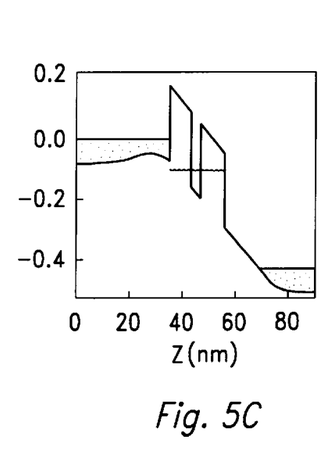
Figure 6:
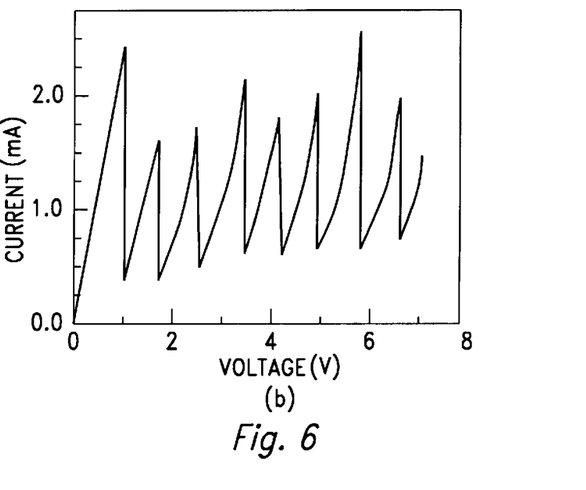
FIG. 6 is a graph of the current-voltage characteristic of an eight-peak resonant tunneling diode.

A resonant tunneling device (RTD) is a device which exhibits negative differential resistance due to resonant tunneling of charge carriers through one or more quantum wells. As shown in FIG. 4 and FIGS. 5A–5C, a peak in the I-V curve of an RTD occurs when the applied bias aligns a quantum conduction state within the device with the Fermi level in one electrical contact. FIGS. 5A, 5B and 5C show the conduction band energy diagrams of the RTD under the applied voltages at points A, B and C in FIG. 4, respectively. The position of the I-V peak in bias voltage is adjustable by controlling the heterostructure composition and layer thicknesses used to fabricate the device. RTDs can be integrated in series to produce a multiple peak RTD (M-RTD) with I-V characteristics such as the example I-V characteristic shown in FIG. 6. In this example, the eight-peak I-V characteristic was obtained by fabricating a stack of RTDs within the same heterostructure. Again, both the number and bias separation of peaks are controlled parameters in the fabrication process.

Figure 7:
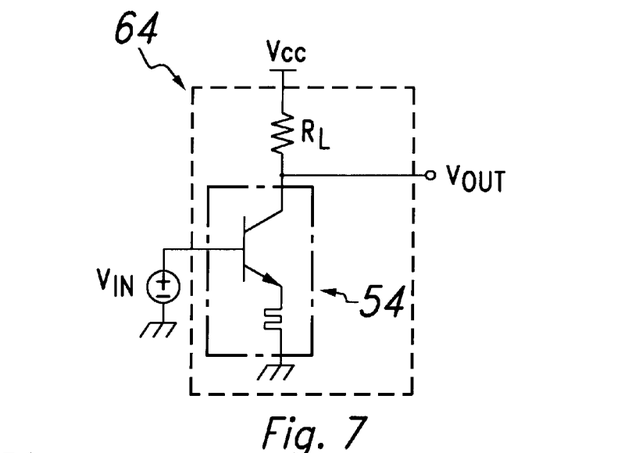
FIG. 7 is a schematic of a resonant tunneling multi-level folding circuit.
Figure 8:
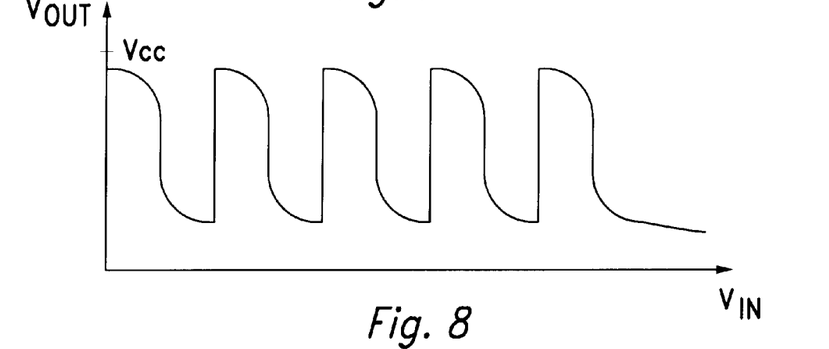
FIG. 8 is the transfer function of the circuit of FIG. 8.

The operation of the interim sum subcircuit 60 can be explained with reference to FIG. 7, which shows a schematic of a portion of the interim sum subcircuit. The preferred embodiment of the multi-level folding circuit 64 comprises a resonant tunneling transistor 54, a load resistor $R_L$ between $V_{CC}$ and the collector, and an input voltage source $V_{IN}$. The preferred embodiment of the resonant tunneling transistor 54, as shown, is the combination of a bipolar transistor and a multiple-peak resonant tunneling diode integrated into the transistor emitter, or, alternatively, a discrete transistor with an M-RTD or multiple single peak RTDs connected to the emitter. As the input voltage $V_{IN}$ is increased from zero, the collector current begins to increase and $V_{OUT}$ begins to decrease from $V_{CC}$. $V_{OUT}$ continues to decrease until the potential across the M-RTD 52 reaches the first peak voltage. As the input voltage continues to increase, the M-RTD 52 acts to restrict the current and $V_{OUT}$ increases. For further increases in $V_{IN}$, this cycle repeats and the input/output relation shown in FIG. 8 results. The circuit can be seen to produce an approximate 'square wave' transfer function. The voltage excursion between levels is determined by the product of the load resistance and the difference between the peak and valley currents of the M-RTD 52 and the load device (shown here as the resistor $R_L$, although active loads are also contemplated). Similarly, the abruptness of the transition between levels is determined primarily by the I-V characteristics of the M-RTD 52 and the load device. The preferred embodiment of the interim sum subcircuit (FIG. 3A) contains two of these resonant tunneling transistor multi-level folding circuits 64 connected by a voltage divider, as shown.

Figure 9:
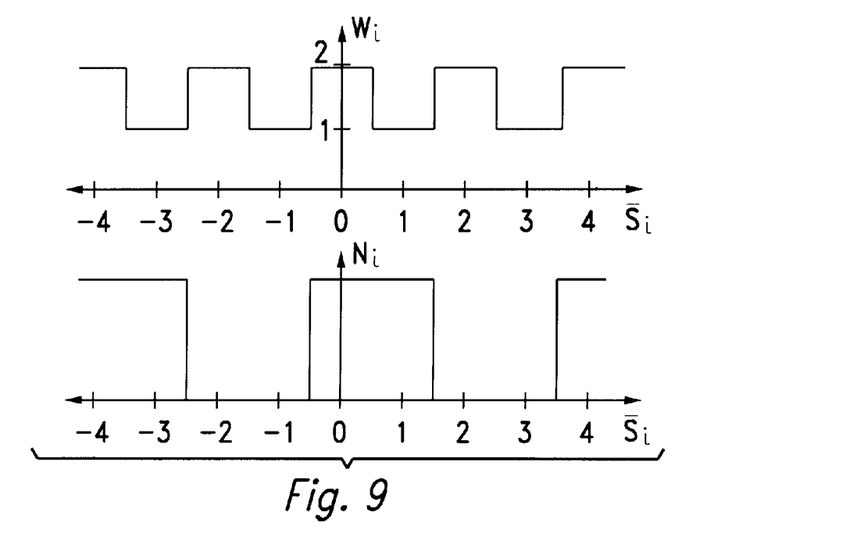
FIG. 9 shows the transfer functions of the intermediate values $M_i$ and $N_i$ versus $S_i$ when the control signal is high.
Figure 10:
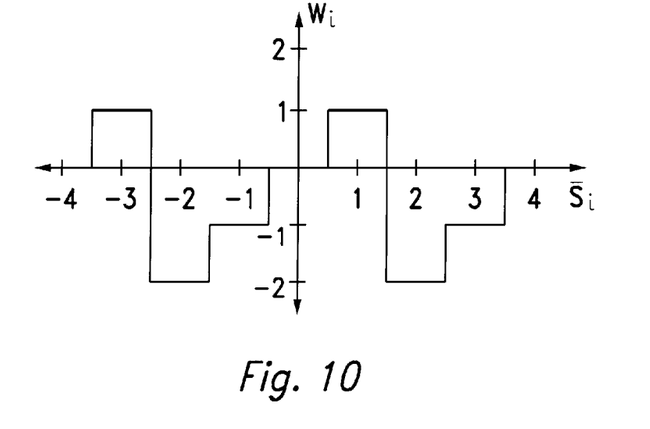
FIG. 10 is a graph of the transfer function of the interim sum subcircuit when the control signal is high.
Figure 11:
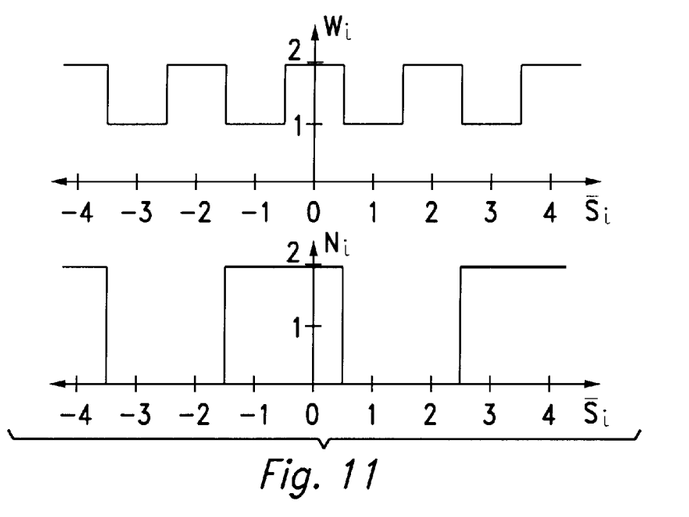
FIG. 11 shows the transfer functions of the intermediate values $M_i$ and $N_i$ versus $S_i$ when the control signal is low.

With reference to FIG. 3A, when the control signal $E_i$ is high, no current flows through transistor $Q_3$. $V_{REF}$ is chosen such that, for MRTDs with similar I-V characteristics, the base voltage of $Q_2$ relative to the voltage reference, $V_{REF}$, is nominally one-half of the base voltage of $Q_1$ relative to the same voltage reference. The relationship between $M_i$ and $N_i$ versus $S_i$ is then given by FIG. 9. As shown, $N_i$ changes state only once for every two changes of state of $M_i$, due to the $Q_1$ to $Q_2$ base voltage division. With reference to FIG. 3B, and again when control signal $E_i$ is high, transistor $Q_8$ is on and transistor $Q_9$ is off. The output $W_i$ depends only on the inputs to transistors $Q_4$ and $Q_5$, and as is clearly shown, $W_i = N_i - M_i$. FIG. 11 shows the transfer function of the interim sum subcircuit when the control signal input is high.

Figure 12:
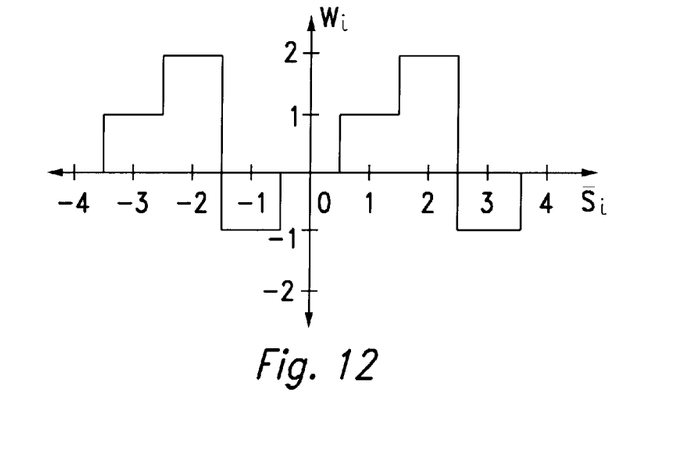
FIG. 12 is a graph of the transfer function of the interim sum subcircuit when the control signal is low.

When the control signal $E_i$ is low, and again with reference to FIG. 3A, a voltage equal to two times the base-emitter junction on-voltage is applied at the base of $Q_3$. Given that the base-to-emitter voltage of conducting transistor $Q_3$ is essentially the same as the forward biased diode voltage across $D_1$ or $D_2$, one base-emitter junction on-voltage appears across the resistor $R_4$ at the emitter of $Q_3$, and therefore the current that flows in $Q_3$ is $V_{BE}/R_4$. This causes the $N_i$ versus $S_i$ characteristic to shift one state ($V_{BE} R_3/R_4$), as shown in FIG. 11. The $M_i$ transfer function is unchanged. With reference to FIG. 3B, and again when control signal $E_i$ is low, transistor $Q_9$ is on and transistor $Q_8$ is off. The output $W_i$ depends only on the inputs to transistors $Q_6$ and $Q_7$, and as is clearly shown, $W_i = M_i - N_i$. FIG. 12 shows the transfer function of the interim sum subcircuit when the control signal input is low.

Figure 13A:
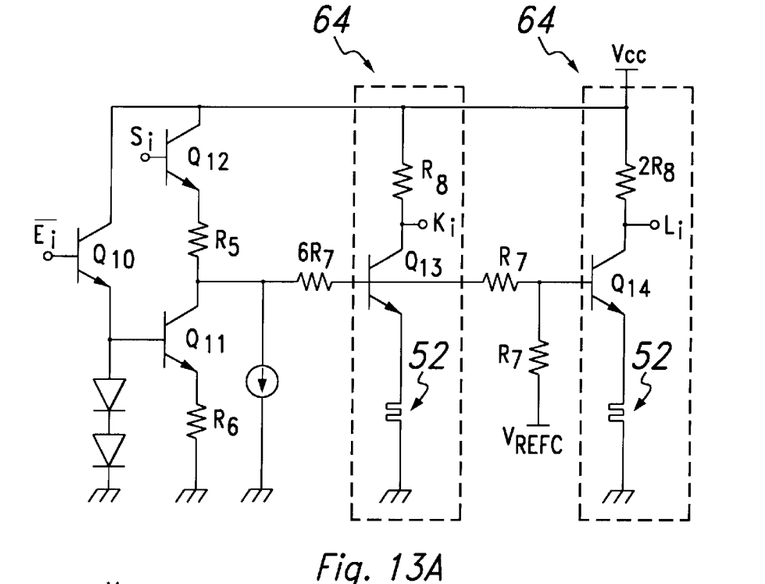
FIGS. 13A–13B are is a schematics of the preferred embodiment of the carry digit subcircuit.
Figure 13B:
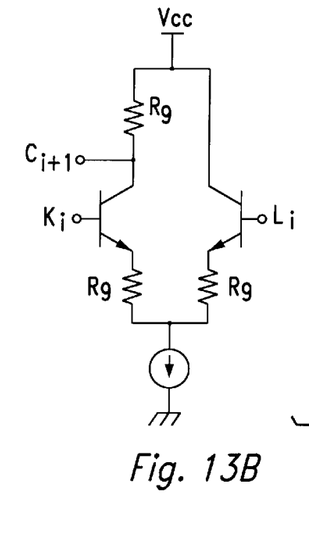

The final subcircuit of the SR5-SR3 converter is the carry digit subcircuit 62. The carry digit subcircuit 62 has inputs $S_i$ and $E_i$, and produces the carry digit $C_{i+1}$, as defined in Step 2, above. The preferred embodiment of the carry digit subcircuit is shown in FIGS. 13A and 13B. As shown, the carry digit subcircuit comprises two resonant tunneling multi-level folding circuits 64 connected by a voltage divider made up of resistors $R_7$ and reference voltage $V_{REFC}$. In addition, shifting circuitry similar to that in the interim sum subcircuit is shown. The operation of the carry digit subcircuit 62 is explained and discussed below.

Figure 14:
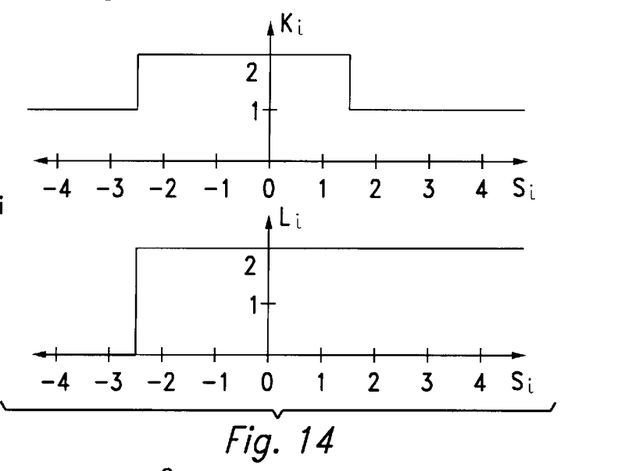
FIG. 14 shows the transfer functions of the intermediate values $K_i$ and $L_i$ versus $S_i$ when the control signal is low.
Figure 15:
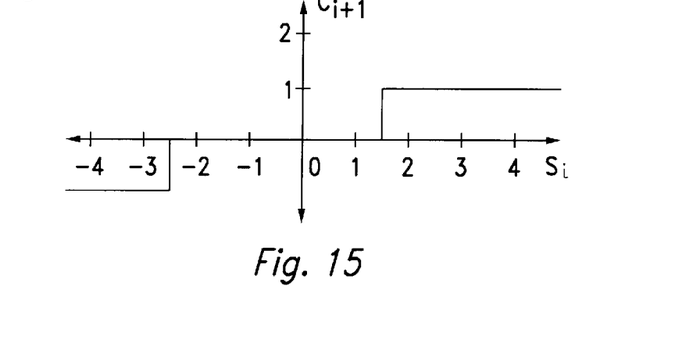
FIG. 15 is a graph of the transfer function of the carry digit subcircuit when the control signal is low.

With control signal $\overline{E}_i = 0$, no current flows in either $Q_{10}$ or $Q_{11}$. The transistor $Q_{12}$, resistor $R_5$ and the current source cause the first upward transition of the $K_i$ folding circuit to occur at state −2.5 (i.e. the $S_i$ input is 'level shifted'), as shown in the $K_i$ transfer function of FIG. 14. The voltage divider circuitry applies one-fourth of the input state $S_i$ to the base of $Q_{13}$ and one-eighth of $S_i$ to the base of $Q_{14}$, causing the $K_i$ folding circuit to exhibit twice the number of state transitions as the $L_i$ circuit for the same $S_i$ input voltage range. The transfer function is shown in FIG. 15. The output levels of the $K_i$ and $L_i$ folding circuits are determined by the peak and valley currents of multiple resonant tunneling device 52 and the value of $R_8$. Outputs $K_i$ and $L_i$ are applied to the circuit of FIG. 13B, which produces output $C_{i+1} = L_i - K_i$. The resulting $C_{i+1}$ transfer function is shown in FIG. 15.

Figure 16:
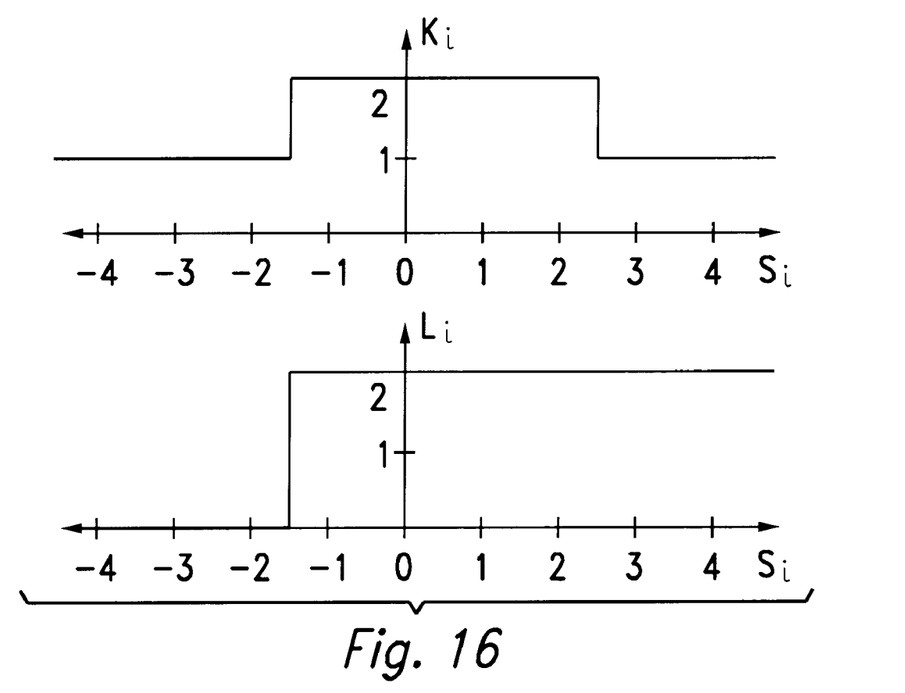
FIG. 16 shows the transfer functions of the intermediate values $K_i$ and $L_i$ versus $S_i$ when the control signal is high.
Figure 17:
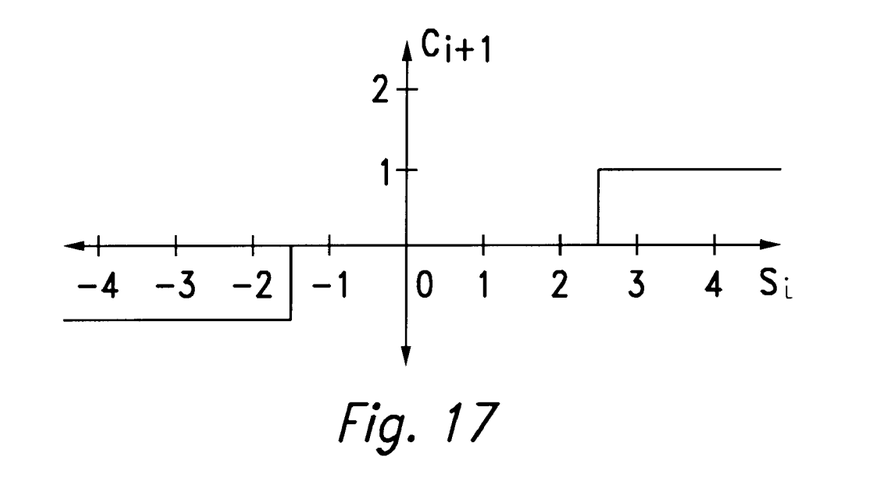
FIG. 17 is a graph of the transfer function of the carry digit subcircuit when the control signal is high.

With control signal $\overline{E}_i = 1$, current flows in $Q_{10}$ and $Q_{11}$, causing an additional level shift to be applied to the input $S_i$. By the proper choice of $R_6$, the input state at which the first upward transition of the $K_i$ folding circuit is shifted to state −1.5, as shown in the $K_i$ transfer function of FIG. 16. The $L_i$ transition is similarly shifted, and the two-to-one base voltage relationship is unchanged. The $L_i$ transfer function is shown in FIG. 16. Again, the circuit of FIG. 13B produces $C_{i+1} = L_i - K_i$. The resulting $C_{i+1}$ transfer function is shown in FIG. 17.

Preferred Resonant Tunneling Device Parameters

In order to produce the $M_i$, $N_i$, $K_i$ and $L_i$ versus $S_i$ transfer functions described above, the multiple-peak resonant tunneling devices 52 should generally exhibit at least four resonant peaks occurring at approximately equally spaced potentials. Multiple-peak resonant tunneling diodes can be obtained either by a series combination of RTDs or by use of a single coupled quantum well heterostructure. When RTDs are combined in series, the off-resonance RTDs in the chain may introduce an undesirable internal series resistance, $R_S$. This series resistance can cause a voltage hysteresis equal in magnitude to the product of the difference between the peak and valley currents and the difference between the negative differential resistance and the positive series resistance $R_S$. The onset of this hysteresis effect occurs when the accumulated series resistance exceeds the RTD negative differential resistance. The total number of RTDs that can be combined in series, therefore, is generally limited by the accumulated series resistance of the specific device implementation.

The electrical properties of a resonant tunneling device are determined, in part, by the thicknesses of its constituent layers. An example of a resonant tunneling diode structure which exhibits a three-peak characteristic is given in Table 1. The structure is a stack of epitaxially formed layers, layer 1 formed on the substrate, layer 2 formed on layer 1, etc.

TABLE 1

| Layer Number | Material | Thickness | Description |
| --- | --- | --- | --- |
| 1 | InGaAs | 0.5 µm | Cathode contact layer |
| 2, 10, 18 | InGaAs | 500Å | Ohmic layer |
| 3, 11, 19 | InGaAs | 20Å | Spacer layer |
| 4, 12, 20 | AlAs | 20Å | Barrier layer |
| 5, 13, 21 | InGaAs | 10Å | Quantum Well |
| 6, 14, 22 | InAs | 20Å | Notch in Quantum Well |
| 7, 15, 23 | InGaAs | 10Å | Quantum Well |
| 8, 16, 24 | AlAs | 20Å | Barrier Layer |
| 9, 17, 25 | InGaAs | 20Å | Spacer Layer |
| 26 | InGaAs | 500Å | Ohmic Layer |
| 27 | InGaAs | 2500Å | Anode Contact Layer |

The measured hysteresis for this example M-RTD is less than 3 mV.

To achieve sufficient noise margins in MVL circuitry, M-RTDs should generally have relatively equal peak currents, relatively equal valley currents, relatively equally spaced peak voltages, modest peak-to-valley ratio, and low hysteresis. Table 2 shows preferred values for some M-RTD parameters.

TABLE 2

| M-RTD Parameter | Preferred Values |
| --- | --- |
| Peak current variation | ≦10% |
| Valley current variation | ≦20% |
| Peak voltage spacing deviation from linearity | ≦5% |
| Peak-to-valley ratio (PVR) | ≧4 |
| Hysteresis | ≦10 mV |

Similarly, preferred values can be given for the bipolar switching transistor parameters. Table 3 shows preferred values for some transistor parameters.

TABLE 3

| Transistor Parameter | Preferred Values |
| --- | --- |
| Common Emitter Current Gain | ≧20 |
| Base-Emitter On-Voltage Mismatch | ≦5 mV |
| Emitter Specific Resistivity | ≦1 µΩcm$^2$ |

In alternate embodiments of the invention, the control signal and related circuitry may be deleted from the preferred embodiment. In the resulting alternate embodiments, output word R will still represent the sum X+Y but will not necessarily be signed digit range-3 base-4.

Many alternate embodiments are possible for the circuits given above. The resonant tunneling multi-level folding circuits may generally be built from any current switching device in conjunction with a M-RTD. A diode may be replaced with a bipolar transistor with its base shorted to its collector.

Table 4, below, provides an overview of some embodiments and the figures.

TABLE 4

| Figure Element | Generic Term | Preferred or Specific Term | Function/Alternate Terms |
|---|---|---|---|
| 40 | Summation circuit | | Summation amplifier; Multi-valued half-adder. Multi-valued summation circuit. Performs $S_i = X_i + Y_i$ or $R_i = W_i + C_i$. |
| 42 | Signed Range-5 to Signed Range-3 converter (SR5-SR3 converter) | | Performs decomposition $4C_{i+1} + W_i = S_i$. |
| 46 | Redundant signed digit 4,3 adder | | Adds two numbers represented in redundant signed digit 4,3 numeration system. |
| 48 | switching device | Bipolar transistor | Heterojunction bipolar transistor; Field effect transistor; |
| 52 | Multiple-peak Resonant Tunneling Diode (M-RTD) | | Exhibits at least two peaks in I-V characteristic |
| 54 | Multiple negative differential transconductance device | Multiple-peak Resonant Tunneling Transistor | Multiple peak resonant tunneling bipolar transistor; Multiple peak resonant tunneling Field Effect Transistor |
| 58 | Comparator | Voltage Comparator | Determines if $S_i$ if greater or less than state "0.5" |
| 60 | interim sum subcircuit | | Generates $W_i$ given $S_i$ and $E_i$ |
| 62 | carry digit subcircuit | | Generates $C_{i+1}$ given $S_i$ and $E_i$ |
| 64 | Multi-level folding circuit | Resonant tunnelling multi-level folding circuit | Exhibits a 'square wave' transfer function due to periodic positive and negative differential resistances of constituent resonant tunneling device(s). |

A few preferred embodiments have been described in detail hereinabove. It is to be understood that the scope of the invention also comprehends embodiments different from those described, yet within the scope of the claims.

Internal and external connections can be ohmic, capacitive, direct or indirect, via intervening circuits or otherwise. Implementation is contemplated in discrete components or fully integrated circuits in silicon, gallium arsenide, or other electronic materials families.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for calculating the sum of two numbers, comprising:

signed digit range-3 base-4 words to represent said two numbers;

at least one device which exhibits negative differential resistance to calculate the sum;

summation circuits A(0), A(1), . . . A(L) with the output of A(i) proportional to the sum of its two inputs;

converters K(0), K(1), . . . K(L) with an input of converter K(i) connected to said output of A(i) and with a first output W(i) and a second output C(i+1) for an input of 4C(i+1)+W(i), said converters comprising a resonant tunneling device; and summation circuits T(1), T(2) . . . T(L) with a first input of T(i) connected to said first output of K(i) and a second input connected to said second output of K(i−1) and an output R(i) proportional to the sum of its two inputs;

whereby the value of the base-4 word having L+2 digits determined by R(0) through R(L+1), where R(0)=W(0) and R(L+1)=C(L+1), is the sum of said two numbers;

wherein said converters comprise two resonant tunneling multi-level folding circuits connected by a voltage divider.

2. The apparatus of claim 1, wherein said resonant tunneling multi-level folding circuits comprise a bipolar transistor with one or more resonant tunneling devices integrated into its emitter.

3. An apparatus for the conversion of a signed range-5 digit into a two digit signed base-4 word, said apparatus comprising:

a first resonant tunneling multi-level folding circuit;

a second resonant tunneling multi-level folding circuit; and a voltage divider circuit to connect said first and second resonant tunneling multi-level folding circuits to convert the signal range-5 digit into said two digit signed base-4 word.

* * * * *